(12) United States Patent
Xu et al.

(10) Patent No.: US 12,518,391 B2
(45) Date of Patent: *Jan. 6, 2026

(54) SYSTEM AND METHOD FOR IMPROVING IMAGE SEGMENTATION

(71) Applicant: eBots Inc., Fremont, CA (US)

(72) Inventors: Zheng Xu, Pleasanton, CA (US); John W. Wallerius, Sunnyvale, CA (US); Sabarish Kuduwa Sivanath, San Jose, CA (US)

(73) Assignee: eBots Inc., Fremont, CA (US)

( * ) Notice: Subject to any disclaimer, the term of this patent is extended or adjusted under 35 U.S.C. 154(b) by 401 days.

This patent is subject to a terminal disclaimer.

(21) Appl. No.: 18/098,427

(22) Filed: Jan. 18, 2023

(65) Prior Publication Data

US 2023/0252637 A1    Aug. 10, 2023

Related U.S. Application Data

(60) Provisional application No. 63/308,336, filed on Feb. 9, 2022.

(51) Int. Cl.
| | | |
|---|---|---|
| *G06T 7/10* | (2017.01) | |
| *G06T 5/50* | (2006.01) | |
| *G06T 7/521* | (2017.01) | |
| *G06T 17/00* | (2006.01) | |
| *G06V 10/141* | (2022.01) | |

(Continued)

(52) U.S. Cl.
CPC .......... *G06T 7/10* (2017.01); *G06T 5/50* (2013.01); *G06T 7/521* (2017.01); *G06T 17/00* (2013.01); *G06V 10/141* (2022.01); *G06V 10/771* (2022.01); *G06V 10/806* (2022.01);

(Continued)

(58) Field of Classification Search
None
See application file for complete search history.

(56) References Cited

U.S. PATENT DOCUMENTS

| | | | | |
|---|---|---|---|---|
| 2010/0328667 A1* | 12/2010 | Wegmuller | ............... | G01J 3/02 356/402 |
| 2015/0025343 A1* | 1/2015 | Gareau | ................... | A61B 5/445 600/328 |

(Continued)

FOREIGN PATENT DOCUMENTS

WO    WO-2020168094 A1  *  8/2020

OTHER PUBLICATIONS

Dudhane, A., Hambarde, P., Patil, P., & Murala, S. (2020). Deep Underwater Image Restoration and Beyond. IEEE Signal Processing Letters, 27, 675-679.*

*Primary Examiner* — Andrew W Bee
*Assistant Examiner* — Christine Zhao
(74) *Attorney, Agent, or Firm* — Yao Legal Services, Inc.; Shun Yao

(57) ABSTRACT

One embodiment can provide a computer-vision system. The computer-vision system can include one or more cameras to capture images of a scene and one or more sets of single-color light sources to illuminate the scene, with a respective set of light sources comprising multiple single-color light sources of different colors. The multiple single-color light sources within a given set can be turned on sequentially, one at a time. The cameras can capture an image of the scene each time the scene is illuminated by a respective single-color light source of a particular color.

16 Claims, 8 Drawing Sheets

(51) Int. Cl.
*G06V 10/771* (2022.01)
*G06V 10/80* (2022.01)

(52) U.S. Cl.
CPC ............... *G06T 2207/10024* (2013.01); *G06T 2207/20081* (2013.01); *G06T 2207/20221* (2013.01)

(56) References Cited

U.S. PATENT DOCUMENTS

| | | | | |
|---|---|---|---|---|
| 2016/0150213 | A1* | 5/2016 | Mutti | G06V 20/20 348/143 |
| 2022/0327777 | A1* | 10/2022 | Buibas | G06T 15/04 |
| 2023/0206413 | A1* | 6/2023 | McCall | H04N 25/134 348/135 |
| 2024/0144640 | A1* | 5/2024 | Kim | G06V 10/803 |

* cited by examiner

SYSTEM AND METHOD FOR IMPROVING IMAGE SEGMENTATION

RELATED APPLICATIONS

This claims the benefit of U.S. Provisional Patent Application No. 63/308,336, entitled "SYSTEM AND METHOD FOR IMPROVEMENT OF IMAGE SEGMENTATION," by inventors Zheng Xu, John W. Wallerius, and Sabarish Kuduwa Sivanath, filed 9 Feb. 2022, the disclosure of which is incorporated herein by reference in its entirety for all purposes.

This disclosure is related to:
U.S. patent application Ser. No. 17/946,803, entitled "3D COMPUTER-VISION SYSTEM WITH VARIABLE SPATIAL RESOLUTION," by inventors Zheng Xu and Sabarish Kuduwa Sivanath, filed 16 Sep. 2022, which application claims the benefit of
U.S. Provisional Patent Application No. 62/256,335, entitled "3D Computer Vision with Variable Spatial Resolution," filed Oct. 15, 2021;
the disclosures of which are incorporated herein by reference in their entirety for all purposes.

BACKGROUND

Field

This disclosure is generally related to a three-dimensional (3D) computer-vision system for robotic applications. Particularly, this invention relates to the improvement of image segmentation.

Related Art

Advanced robotic technologies have dramatically changed the way products are produced and led to the Fourth Industrial Revolution (also referred to as Industry 4.0). The Fourth Industrial Revolution improves on the computing and automation technologies developed during the Third Industrial Revolution by allowing computers and robotics to connect and communicate with one another to ultimately make decisions without human involvement. A combination of cyber-physical systems, the Internet of Things (IoT), and the Internet of Systems (IoS) makes Industry 4.0 possible and the smart factory a reality. Smart machines can get smarter as they gain access to more data and learn new skills, which can lead to more efficient and productive and less wasteful factories. Ultimately, a network of digitally connected smart machines that can create and share information will result in the true "lights-out manufacturing" where no human supervision is needed.

One of the critical components in achieving Industry 4.0 is 3D computer vision used to guide the robot to perform various manufacturing tasks, such as manufacturing of consumer electronics (e.g., smartphones, digital cameras, tablet or laptop computers, etc.). While performing a manufacturing task, the 3D computer-vision system is expected to recognize various components (some are quite tiny) within the workspace in order to guide the robot to grasp a component of interest. This can be done by capturing images of the workspace and identifying components within the images. Instance segmentation of an image, or the ability to identify the pixels belonging to each individual component in a scene, has the potential to enhance the robotic perception pipelines for the aforementioned instance-specific grasping robotic application, where a target component is identified and grasped among potentially unknown distractor components in a cluttered environment. A variety of machine-learning approaches have demonstrated the ability to segment colored or red, green, and blue (RGB) images into pre-defined semantic classes (such as humans, bicycles, cars, etc.) with reasonable accuracy and reliability by training deep neural networks on massive, hand-labeled datasets. Although the accuracy of segmentation under RGB or RGB-Depth (RGB-D) meets the basic requirements of warehouse pick-and-place applications, it is still far from meeting the requirements of precision manufacturing. Moreover, existing training datasets typically contain RGB images of natural scenes and warehouse applications that are quite different from the cluttered scenes commonly seen in manufacturing lines. The RGB representation of a natural scene obtained by a color camera does not contain the full spectrum of light, and its accuracy of segmentation cannot meet the requirements of high-precision manufacturing. In addition, industrial applications usually use black-and-white (BW) cameras in order to meet various high-resolution requirements. The BW cameras can produce images that include grayscale information of the scene but lack the color information. Images without the color information may compromise the performance of instance segmentation.

SUMMARY

One embodiment can provide a computer-vision system. The computer-vision system can include one or more cameras to capture images of a scene and one or more sets of single-color light sources to illuminate the scene, with a respective set of light sources comprising multiple single-color light sources of different colors. The multiple single-color light sources within a given set can be turned on sequentially, one at a time. The cameras can capture an image of the scene each time the scene is illuminated by a respective single-color light source of a particular color.

In a variation on this embodiment, the computer-vision system can include an image-segmentation unit to apply a machine-learning technique to generate a segmentation result of the scene based on multiple images corresponding to different colors.

In a further variation, the image-segmentation unit can implement a deep-learning neural network comprising a plurality of input channels, each input channel to receive an image of the scene illuminated by a single-color light source of a corresponding color.

In a further variation, the deep-learning neural network can include a feature-extraction-and-fusing layer to extract a feature map from each image of the scene and generate a fused feature map by concatenating feature maps extracted from multiple images corresponding to different colors.

In a further variation, the computer-vision system can include one or more structured-light projectors to project structured light onto the scene and a depth-information-extraction unit to extract depth information based on images of the scene illuminated by the structured light.

In a further variation, the image-segmentation unit can generate the segmentation result of the scene by combining the multiple images corresponding to different colors with the depth information.

In a further variation, the computer-vision system can include a 3D-point-cloud-computation unit to compute a 3D point cloud of an object of interest based on the segmentation result overlaid on the images of the scene illuminated by the structured light.

In a variation on this embodiment, the multiple single-color light sources can include light-emitting diodes (LEDs), and colors of the multiple single-color light sources can range between ultraviolet and infrared.

In a variation on this embodiment, one or more sets of single-color light sources can be mounted on a ring-shaped mounting structure positioned above the scene.

In a further variation, multiple single-color light sources of the same color can be arranged on the ring-shaped mounting structure in a rotationally symmetric manner.

One embodiment can provide a computer-implemented method. The method can include configuring, by a computer, one or more sets of single-color light sources to illuminate a scene. A respective set can include multiple single-color light sources of different colors. Configuring the single-color light sources can include alternately turning on the single-color light sources in each set, one at a time. The method can further include configuring one or more black-and-white (BW) cameras to capture one image of the scene each time the scene is illuminated by single-color light sources of a particular color.

BRIEF DESCRIPTION OF THE FIGURES

In the figures, like reference numerals refer to the same FIG. elements.

DETAILED DESCRIPTION

Figure 1:
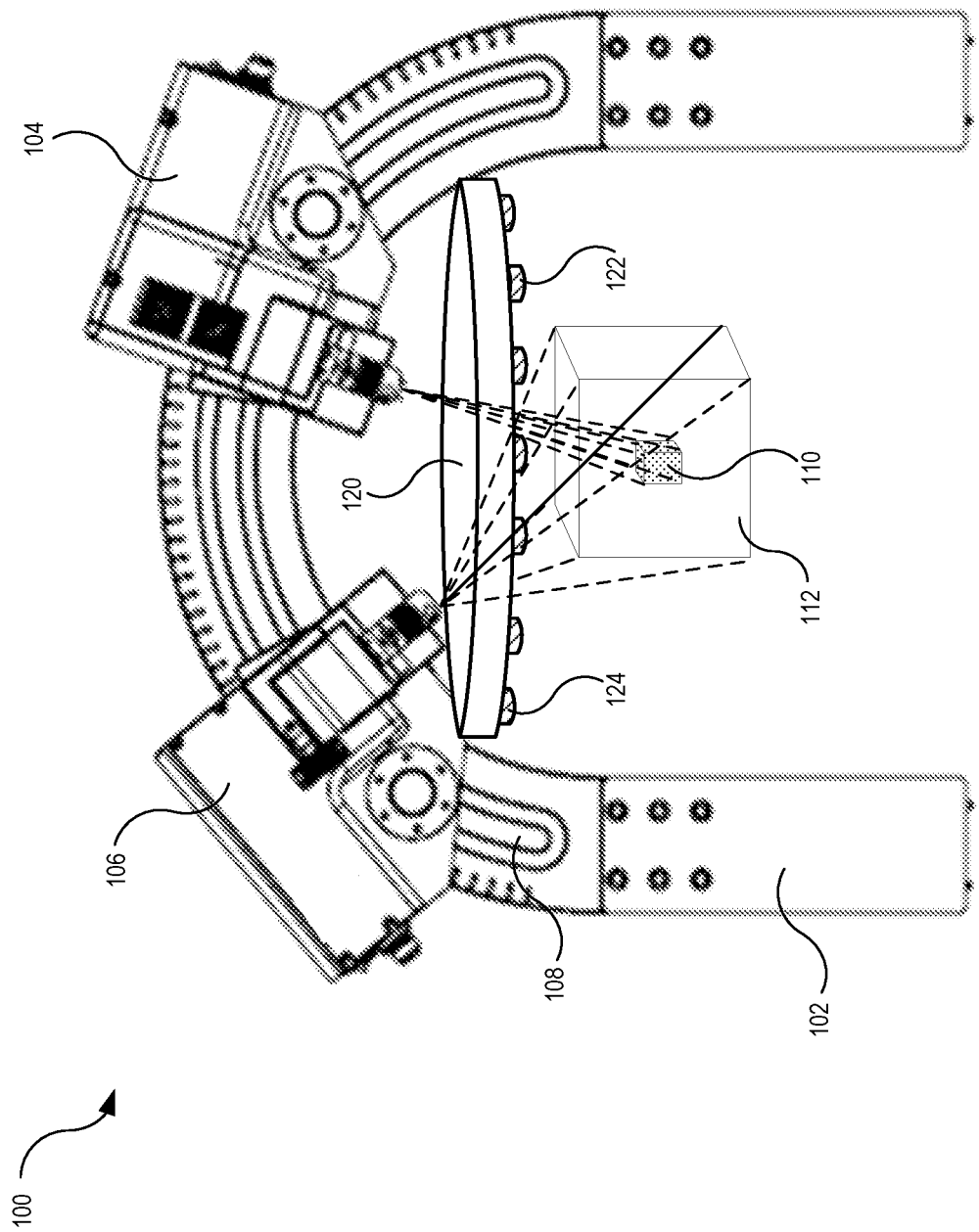
FIG. 1 illustrates an exemplary computer-vision system with multiple single-color light sources, according to one embodiment.

The following description is presented to enable any person skilled in the art to make and use the embodiments and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown but is to be accorded the widest scope consistent with the principles and features disclosed herein.

Overview

Embodiments described herein solve the technical problem of improving image segmentation accuracy and reliability for a computer-vision system under artificial illuminations. A 3D computer-vision system can include one or more 3D camera units, with each camera unit including a pair of BW cameras and a structured-light projector. The computer-vision system can further include a discrete multi-wavelength-illumination unit that includes a plurality of single-color light sources, such as light-emitting diodes (LEDs). In some embodiments, the single-color light sources can also be referred to as single-wavelength light sources, with each light source emitting light of a particular wavelength or a particular wavelength band. More specifically, the multi-wavelength-illumination unit can include a ring-shaped supporting frame (or a supporting ring) positioned above the scene, and the single-color light sources can be attached to and evenly distributed along the circumference of the supporting ring. The single-color light sources can be configured to alternately illuminate the scene, and the BW cameras can capture different images of the scene illuminated by lights of different colors or wavelengths. These images can include implicit spectrum information (i.e., color) of the scene although they are grayscale images. The computer-vision system can further include an image-segmentation unit configured to apply a machine-learning technique to process the grayscale images of the scene illuminated by lights of different colors. More specifically, these colored-light-illuminated grayscale images can be concatenated in an increasing wavelength order and sent to a previously trained deep-learning neural network, which can then output the image-segmentation result (e.g., a semantic or instance map). Compared with a conventional computer-vision system that captures grayscale images under white or natural light and performs image segmentation on the white-light-illuminated grayscale images, the disclosed computer-vision system can generate segmented images with improved accuracy.

3D Computer-Vision System with BW Cameras

Image segmentation is the process of partitioning a digital image into multiple segments, with each segment comprising a set of pixels. The goal of segmentation is to change the representation of an image (i.e., a collection of pixels) into something that is more meaningful and easier to analyze. Image segmentation can be used to locate objects (e.g., electronic components) within the image and can be an operation performed by the 3D computer-vision system when guiding the movements of the robot. The 3D computer-vision system needs to identify the various components within the workspace in order to instruct the robot to grasp the correct component during an automated manufacturing process.

Image segmentation can include semantic segmentation (which detects, for each pixel, a class of object to which the pixel belongs), instance segmentation (which detects, for each pixel, an instance of the object to which the pixel belongs), and panoptic segmentation that combines semantic and instance segmentations. There are different approaches to image segmentation, and many approaches (especially machine-learning-based approaches) can take advantage of the color or RGB information of objects in an image while performing the segmentation. For example, two different objects may have different colors, and the color difference can make it easier to distinguish pixels belonging to one object from pixels belonging to the other. However, the RGB color camera uses Bayer filter to form RGB pattern to represent the color of a scene. The imaging sensor receives only three major wavelengths of light spectrum, i.e. red peaked at 600 nm, green peaked at 525 nm, and blue peaked at 455 nm, a vast amount of spectrum of light is lost. For the purpose of perception and image segmentation, it is desirable to obtain a full spectrum of light reflected from the object of interest.

BW cameras can capture images at a much higher spatial resolution compared with RGB cameras because RGB cameras require multiple color sensors to produce one image pixel. Therefore, many industrial cameras, including cameras used for robotic applications, are BW cameras that capture grayscale images with each image pixel having an intensity value ranging from no intensity (e.g., 0) to full intensity (e.g., 255). However, grayscale images cannot provide color information about the scene. As discussed previously, achieving accurate segmentation of images without color information may be challenging.

According to some embodiments, single-color light sources can be used to illuminate the scene such that different grayscale images of the same scene illuminated by lights of different colors can be captured. Because objects of different colors reflect the lights of different colors differently (e.g., a red object reflects more red light than green light), those grayscale images captured under lights of different colors (or lights of different colors) can include color information that would be useful for image segmentation. In some embodiments, a number of single-color light sources (e.g., LEDs) can be placed above the workspace to illuminate the workspace while the cameras are capturing images of the workspace.

FIG. 1 illustrates an exemplary computer-vision system with multiple single-color light sources, according to one embodiment. A computer-vision system 100 can include a supporting frame 102 and a pair of camera units 104 and 106 mounted on supporting frame 102. More specifically, supporting frame 102 can include an arc-shaped slot 108 into which the two camera units (e.g., units 104 and 106) are mounted. The two camera units can each slide along slot 108 and can be arranged to have different viewing angles of the workspace. The arc shape of slot 108 (i.e., being a portion of a circle) ensures that the viewing distances (i.e., the distance between the camera modules and the object under observation) of camera units 104 and 106 are substantially similar, given that the to-be-viewed object is located near the center of the circle. In some embodiments, the angle between the optical axes of the two camera units can be between 15° and 45°. In alternative embodiments, instead of being mounted onto the same supporting frame, camera units 104 and 106 can be mounted onto separate supporting structures, and the two camera units can have different viewing distances. In further embodiments, the number of camera units mounted on supporting frame 102 can be more or fewer than two. Having more than one camera unit allows computer-vision system 100 to obtain images of the work scene from different angles and/or at different resolutions.

In the example shown in FIG. 1, camera unit 104 can include high-resolution cameras with a smaller viewing region (also referred to as a high-resolution viewing region) 110, and camera unit 106 can include low-resolution cameras with a larger viewing region (also referred to as a low-resolution viewing region) 112. Camera units 104 and 106 can be arranged in such a way that high-resolution and low-resolution viewing regions 110 and 112 overlap, with high-resolution viewing region 110 located approximately at the center of low-resolution viewing region 112. A more detailed description of the high-resolution and low-resolution camera units can be found in U.S. patent application Ser. No. 17/946,803, entitled "3D COMPUTER-VISION SYSTEM WITH VARIABLE SPATIAL RESOLUTION," by inventors Zheng Xu and Sabarish Kuduwa Sivanath, filed 16 Sep. 2022, the disclosure of which is incorporated herein by reference.

Each camera unit can include one or more BW cameras (not shown in FIG. 1) for capturing grayscale images of a workspace or work scene and an optional white light source (also not shown in FIG. 1) for illuminating the workspace. Images captured by the cameras under the illumination of the white light do not include any color information. To obtain color information, in some embodiments of the instant application, computer-vision system 100 can further include a multi-wavelength-illumination unit that comprises a light-mounting structure 120 and a plurality of single-color light sources (e.g., single-color light sources 122 and 124) mounted on light-mounting structure 120. Light-mounting structure 120 can be attached to supporting frame 102 using various attaching mechanisms, which are not shown in FIG. 1, or it can be attached to a separate supporting structure. In one example, light-mounting structure 120 can be directly attached to supporting frame 102. In a different example, light-mounting structure 120 can be attached to camera unit 104 and/or camera unit 106. As disclosed previously, single-color light sources can include LEDs of various colors, with wavelengths ranging from the ultraviolet band (e.g., around 380 nm) to the infrared band (e.g., around 850 nm). In addition to an LED, each single-color light source can include a lens system (e.g., a beam collimator) that can ensure that light emitted by the LED can illuminate the workspace substantially uniformly.

Figure 2A:
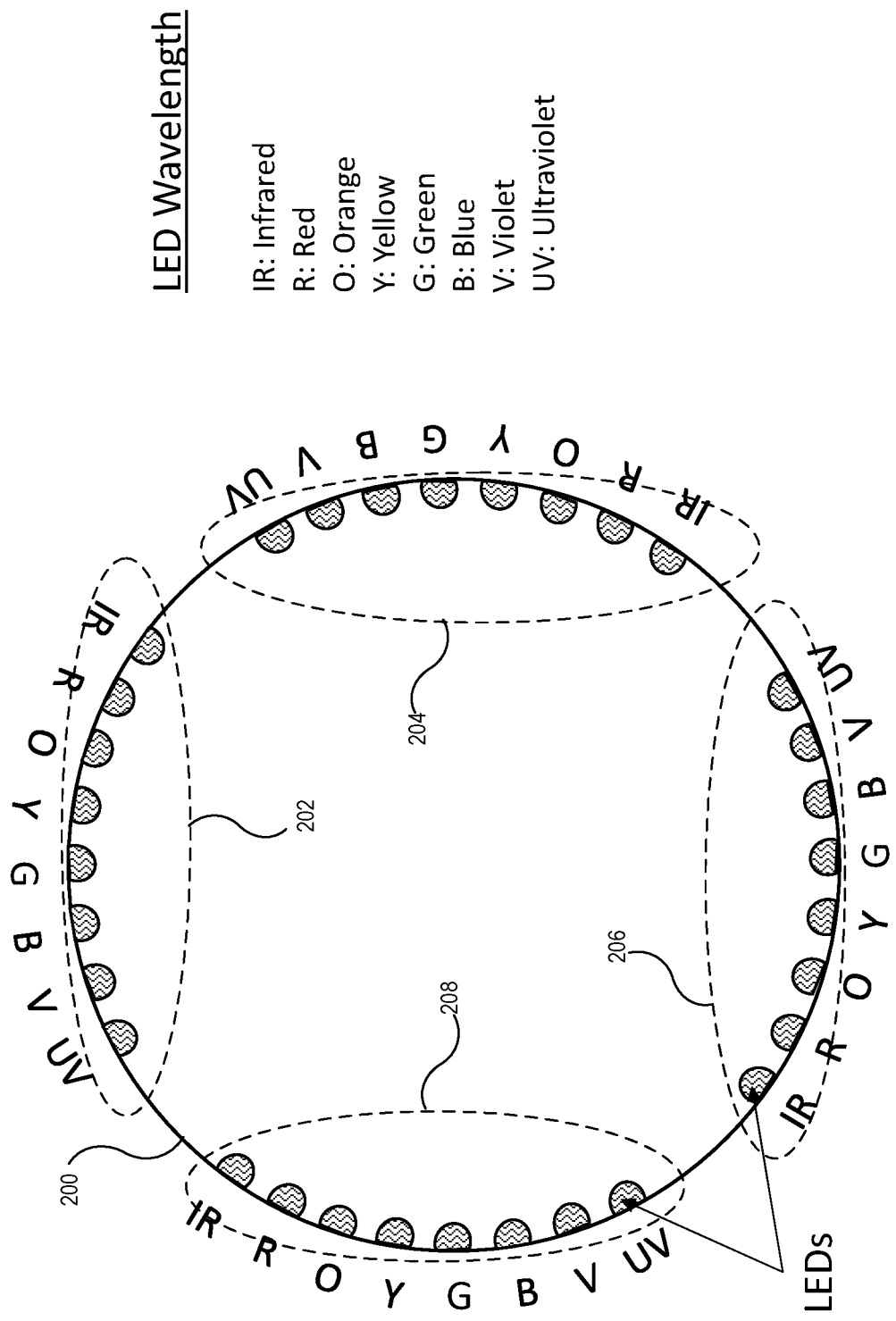
FIG. 2A illustrates an exemplary arrangement of a plurality of single-color light sources, according to one embodiment.

FIG. 2A illustrates an exemplary arrangement of a plurality of single-color light sources, according to one embodiment. In the example shown in FIG. 2A, a plurality of single-color light sources are arranged around a circle 200. More specifically, the single-color light sources can include multiple sets of LEDs (i.e., sets 202-208), with each set including multiple LEDs of different colors. In some embodiments, the wavelengths of the LEDs can range from the ultraviolet band (e.g., about 380 nm) to the infrared (e.g., about 850 nm). In this example, each set can include an infrared LED (e.g., 850 nm), a red LED (e.g., 690 nm), an orange LED (e.g., 625 nm), a yellow LED (e.g., 590 nm), a green LED (e.g., 555 nm), a blue LED (e.g., 475 nm), a violet LED (e.g., 445 nm), and an ultraviolet LED (e.g., 380 nm). The number of LEDs and their colors can be different from the above example.

Including multiple sets of LEDs can allow multiple LEDs of the same color (e.g., the four red LEDs in FIG. 2A) to illuminate the scene from different angles, thus reducing shadows. To maximize the shadow-reducing effect, in some embodiments, the LEDs are arranged along circle 200 in such a way that LEDs of the same color are arranged symmetrically with each other. In the example shown in FIG. 2A, the multiple sets of LEDs are arranged to have a rotational or radial symmetry around the center of circle 200, and the order of symmetry is four. The LEDs within each set can be evenly spaced and aligned according to their wavelengths. In the example shown in FIG. 2A, the wavelengths of the LEDs in each set increase in the counterclockwise direction.

During the robot operation, the LEDs of different colors can be turned on alternately, one color at a time, to allow the BW cameras to capture different grayscale images of the scene under the illumination of the light of different colors. A grayscale image captured under the illumination of colored light can also be referred to as a pseudo-color image due to color information included in the image. Increasing the number of colors of the single-color light sources can allow BW cameras to collect more color information about the scene but will result in more data overhead because at least one grayscale image is generated for each color. In some embodiments, the colors of the single-color light sources can be selected based on the types of components in the work scene. For example, metals can have a stronger reflection for shorter wavelength light (e.g., ultraviolet light) and insulating material may have a stronger reflection for longer wavelength light (e.g., infrared light). Therefore, including both wavelengths can be helpful in collecting color information useful for distinguishing components made of these two different types of material.

Figure 2B:
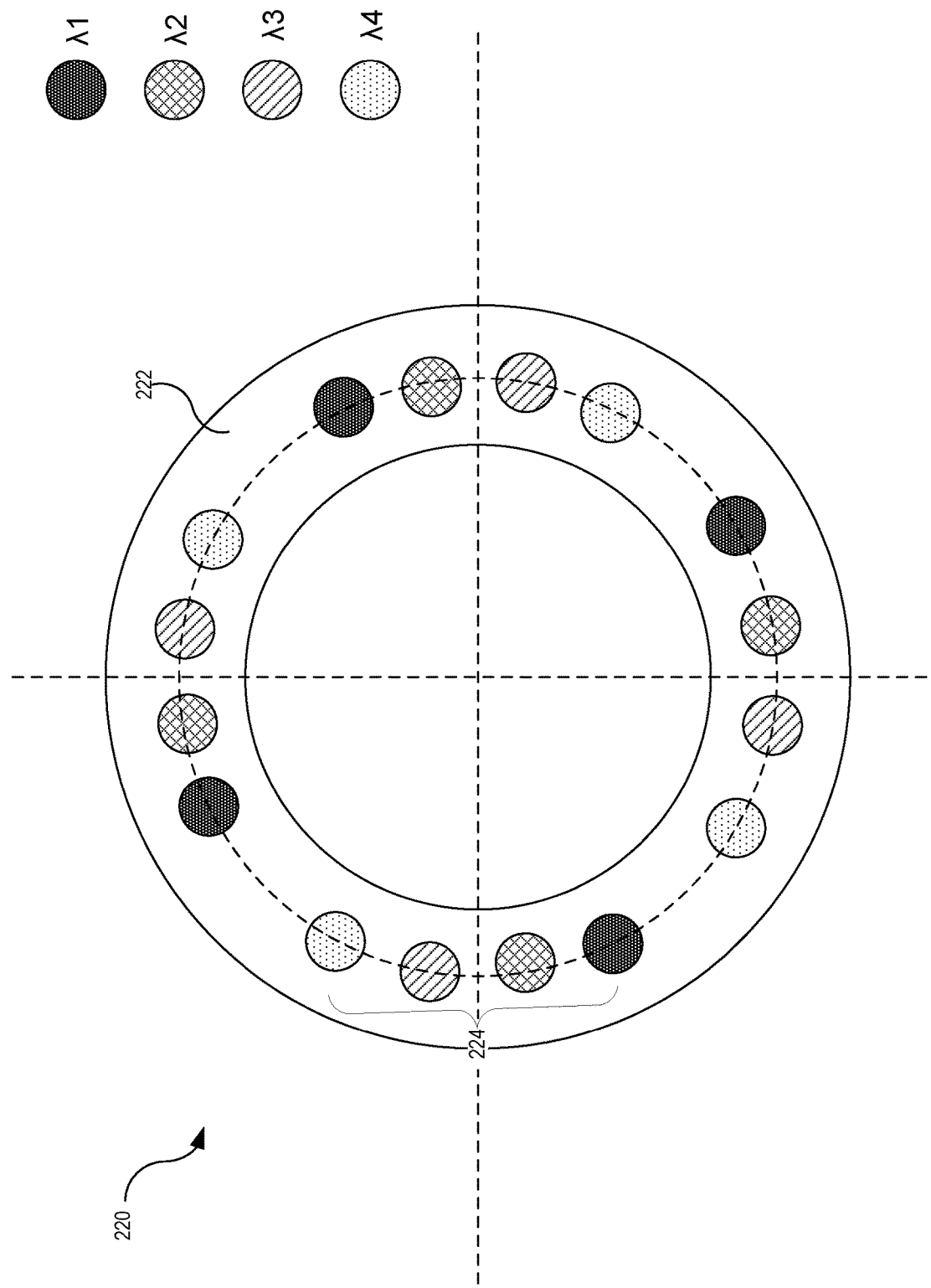
FIG. 2B illustrates an exemplary practical implementation of an RGB-light-illumination unit, according to one embodiment.

FIG. 2B illustrates an exemplary practical implementation of a multi-wavelength-illumination unit, according to one embodiment. In this example, multi-wavelength-illumination unit 220 can include a ring-shaped mounting structure 222 and multiple sets of single-color light sources (e.g., a set 224 comprising multiple single-color light sources) mounted on ring-shaped mounting structure 222.

Ring-shaped mounting structure 220 can be similar to light-mounting structure 120 shown in FIG. 1. Ring-shaped mounting structure 220 can be positioned above (e.g., supported by a certain kind of supporting structure) the work scene with the single-color light sources facing the work scene. There is no limitation on the shape and attaching mechanism of the supporting structure, as long as it does not block the light path of the light sources and the cameras. The cavity in the center of ring-shaped mounting structure 222 allows access to the work scene by cameras and light sources. In some embodiments, ring-shaped mounting structure 220 can have a configurable tilt angle to allow the illumination angle to be adjusted based on practical needs (i.e., based on the type of components within the work scene). In one example, the tilt angle of ring-shaped mounting structure 220 can be determined based on the viewing angle of the cameras (e.g., camera unit 104 or 106).

In the example shown in FIG. 2B, there are four sets of single-color light sources, with each set including four evenly spaced single-color light sources. In some embodiments, each single-color light source can include an LED of a particular wavelength or wavelength band (e.g., $\lambda 1$, $\lambda 2$, $\lambda 3$, or $\lambda 4$) and a collimator for collimating the emitted light. The LEDs of the same wavelength can be symmetrically arranged around ring-shaped supporting structure 222. In this example, there are four sets of LEDs, each set comprising four LEDs, and the order of the rotational symmetry can be four. In one embodiment, the four LEDs in each set can include infrared, yellow, green, and violet LEDs. Depending on the type of components in the work scene, in some embodiments, each single-color light source may also include a light diffuser to reduce speckles. For example, diffusers may be needed when there are highly reflective metal components in the scene. The intensity of illumination at each color (i.e., the light intensity of each light source) can also be adjusted based on the camera settings and the type of scene to obtain optimal exposure and reveal maximum features in the scene.

Using FIG. 2B as an example, to capture visual information of a work scene, light sources or LEDs of the four colors or wavelength bands can be configured to alternately turn on according to their colors. For example, the four light sources of a first wavelength or color (e.g., $\lambda 1$ or violet) can be turned on simultaneously to allow one or more grayscale images of the scene illuminated by the first color (e.g., violet) light to be captured by the cameras. In this disclosure, an image captured under violet light can be referred to as a pseudo-violet image, an image captured under infrared light can be referred to as a pseudo-infrared image, etc. Subsequent to capturing the pseudo-color image of the first color, the four light sources of the first color are turned off whereas the four light sources of a second wavelength or color (e.g., $\lambda 2$ or green) are turned on to allow a pseudo-green image to be captured. The same operation can be repeated for $\lambda 3$ (or yellow) and $\lambda 4$ (or infrared) to obtain a set of pseudo-color images of different colors. These pseudo-color images carry implicit color information. Image segmentation performed based on these pseudo-color images can generate a more accurate result. Note that compared with color cameras with RGB sensors that can only receive red, green, and blue lights, the proposed computer-vision system makes it possible to obtain the full optical spectrum information by illuminating the scene using LEDs of different wavelengths. In theory, even an infinity number of wavelengths can be achieved. Therefore, this approach can obtain much richer optical information of the scene.

There are various approaches to performing image segmentation. In some embodiments, a machine-learning technique based on neural networks can be used. More specifically, a machine-learning model (e.g., a deep-learning neural network) can be trained and then used to segment the images (by performing either semantic segmentation or instance segmentation). In conventional approaches, the trained model can receive as input a single image and output a segmented image (e.g., a semantic map or an instance map). As discussed previously, segmentation performed on a color image can be more accurate than segmentation performed on a grayscale image. To enhance the perception of a computer-vision system with BW cameras (e.g., by improving the image segmentation accuracy), in some embodiments, the computer-vision system can use the BW cameras to capture pseudo-color images (i.e., grayscale images captured under the illumination of lights of different colors) and send pseudo-color images of different colors (meaning that each image is captured under the light of a unique color) to a trained machine-learning model to generate a semantic or instance map of the work scene. Because the pseudo-color images of different colors include implicit color information of the work scene, the machine-learning model can generate a more accurate segmentation result using these pseudo-color images as input.

In some embodiments, the machine-learning model can include a Mask Region-based Convolutional Neural Network (Mask R-CNN), which can output a binary mask for each region of interest. In one embodiment, the machine-learning model can have multiple input channels (one channel per color), and the multiple pseudo-color images can be concatenated along the channel dimension (e.g., in increasing wavelength order) before being sent to the multiple input channels of the machine-learning model. More specifically, each pseudo-color image can be sent to a corresponding input channel.

Figure 3:
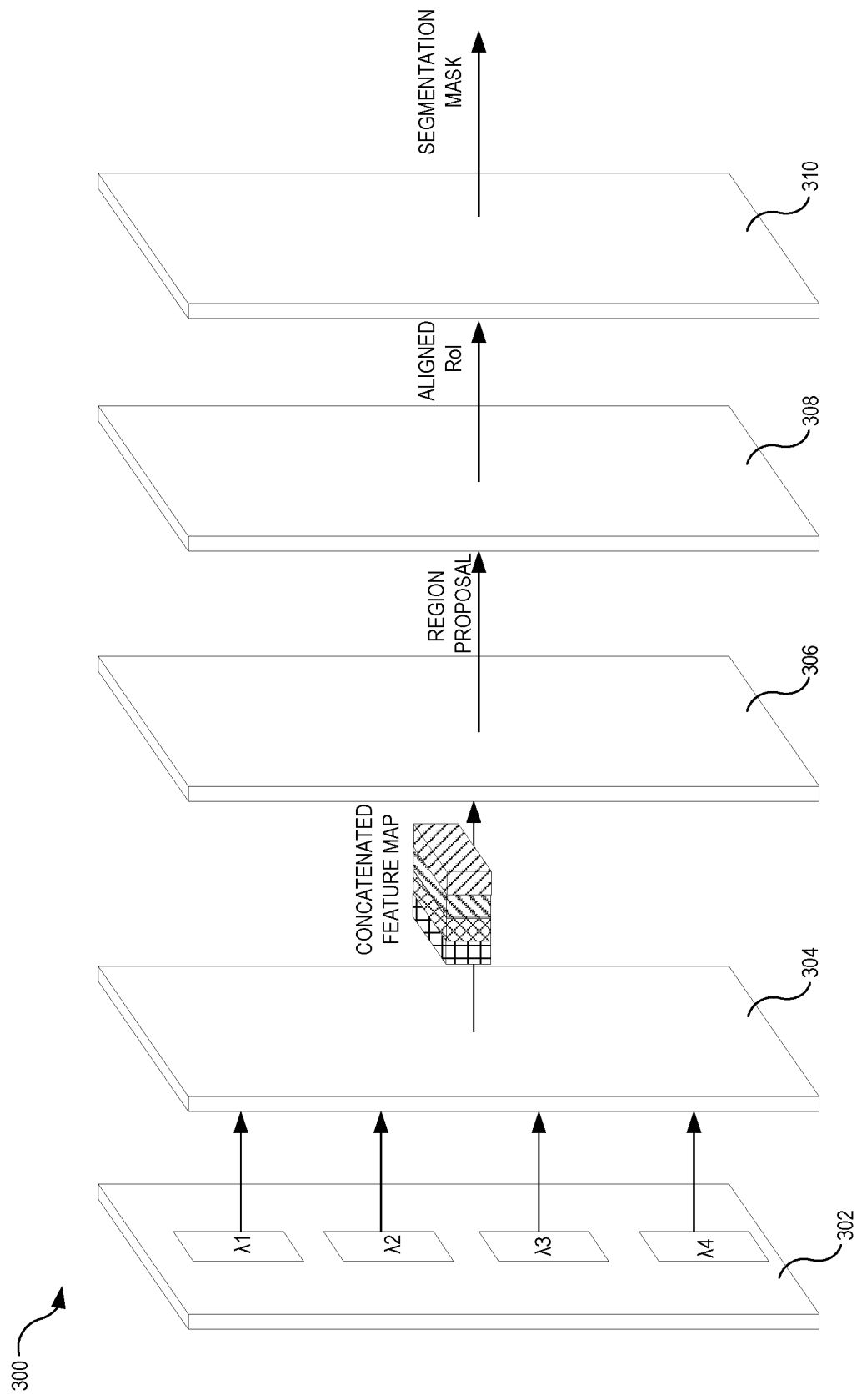
FIG. 3 illustrates exemplary architecture of a machine-learning model for image segmentation, according to one embodiment.

FIG. 3 illustrates the exemplary architecture of a machine-learning model for image segmentation, according to one embodiment. In FIG. 3, a machine-learning model 300 can include multiple stages: an input stage 302, a feature-extraction-and-fusing stage 304, a region-proposal stage 306, a region-of-interest (RoI)-align stage 308, and a mask-prediction stage 310.

Input stage 302 can include multiple color channels, each channel configured to receive one pseudo-color image of the same scene. More specifically, a particular color channel receives a grayscale image of the scene captured under the illumination of that particular color. In the example shown in FIG. 3, there are four input channels corresponding to four wavelength bands (e.g., λ1, λ2, λ3, and λ4).

Feature-extraction-and-fusing stage 304 can include neural networks (one for each input channel) that can extract feature maps from each image. In addition, feature-extraction-and-fusing stage 304 can fuse (e.g., by concatenating) the extracted feature maps from the different color channels into a fused feature map.

Region-proposal stage 306 can extract region proposals (i.e., regions of the image that potentially contain objects). Region-of-interest (RoI)-align stage 308 can include a neural network that can predict the class labels and bounding boxes for each RoI (i.e., an aligned RoI). Mask-prediction layer 310 can generate a segmentation mask (e.g., using one or more CNNs) for each RoI. The various neural networks in machine-learning model 300 (e.g., the feature-extraction neural networks and the mask-prediction neural networks) can be trained offline using training samples comprising labeled images (images labeled with segmentation masks). For example, each training sample can include a set of labeled pseudo-color images of multiple colors.

In the example shown in FIG. 3, information from the different pseudo-color images can be fused at feature-extracting-and-fusing stage 304, where multiple images are fed into the feature-extraction neural networks separately to generate multiple feature maps that are then concatenated to form a fused feature map. In alternative embodiments, it is also possible to combine the pseudo-color images (e.g., via concatenation) before feature extraction and then feed the combined image to the feature-extraction neural network to generate one feature map.

To further improve the perception of the computer-vision system, in some embodiments, depth information (e.g., depth map) can also be captured and combined with pseudo color images for image segmentation. The depth information of the scene can be obtained by capturing image(s) of the scene under the illumination of structured light. More specifically, each camera unit shown in FIG. 1 can include a Digital Light Processing (DLP) projector that can project codified images (e.g., spatially varying light patterns) onto the scene. 3D information about the scene (e.g., 3D surface profiles of objects within the scene) can be extracted from the codified images reflected from objects within the scene. In some embodiments, a depth map can be generated. In one embodiment, a 3D point cloud of the scene can be generated based on the image(s) of the scene illuminated by the structured light.

The combination of pseudo-color images and the depth information (e.g., a depth map) of the scene can further enhance the accuracy of the image segmentation. In some embodiments, the pseudo-color images and a respective depth map can be sent to the neural networks as input to generate a more accurate segmentation mask. The fusion of the depth map with the pseudo-color images of different colors may generate highly unique features to facilitate segmentation. In one embodiment, the fusion can be performed at an earlier stage, where the pseudo-color images and the depth map are concatenated before being fed to the feature-extraction neural network to extract one feature map. Alternatively, the fusion can be performed at a later stage, where the pseudo-color images and the depth map are separately fed to different input channels of the feature-extraction neural networks, and the extracted two feature maps are concatenated to generate one feature map. The machine-learning model can output enhanced segmentation labels or masks by including the depth information. Moreover, the enhanced segmentation result can further improve the separation of the 3D point cloud of an object from the surrounding distractors and background.

Figure 4:
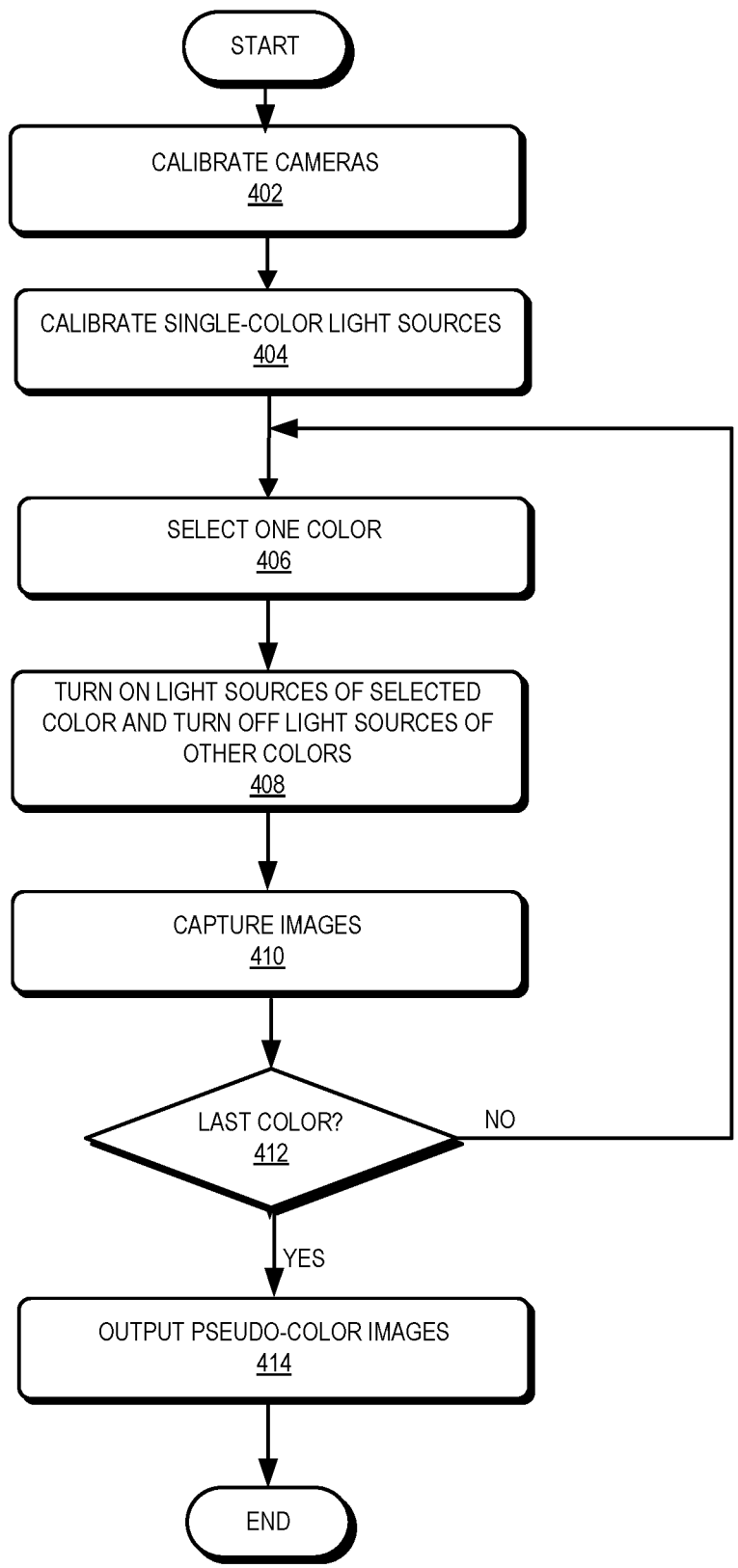
FIG. 4 presents a flowchart illustrating an exemplary process for obtaining pseudo-color images, according to one embodiment.

FIG. 4 presents a flowchart illustrating an exemplary process for obtaining pseudo-color images, according to one embodiment. The operation starts with calibrating the cameras (operation 402) and calibrating the plurality of single-color light sources (operation 404). Calibrating the cameras can include adjusting the settings (e.g., zoom, focus, and aperture) of the cameras. Calibrating the single-color light sources can include adjusting the tilt angle of the light-mounting structure (thus the angle of illumination) and the intensity of each light source. In some embodiments, the single-color light sources can include LEDs, and adjusting the light intensities can include adjusting the bias current (or voltage) of each LED. In one embodiment, the light sources of the same color can be configured to have substantially the same intensity. In some embodiments, calibrations of the cameras and light sources are correlated to obtain the best image-capturing condition (e.g., exposure).

Subsequent to calibrating the cameras and the light sources, the computer-vision system can select one color or wavelength band (e.g., the shortest wavelength or a random color) (operation 406) and configure the light sources such that only those light sources of the selected color are turned on while other light sources are turned off (operation 408). In some embodiments, ambient white light can also be turned on to supplement the illumination. Under the illumination of the selected single-color light sources, the computer-vision system can configure the cameras to capture at least one image of the scene (operation 410). Such an image can be referred to as a pseudo-color image of the particular color (e.g., a pseudo-color image of λ1 or a pseudo-violet image). The system can then determine whether the selected color is the last one (operation 412). If so, the system outputs the set of pseudo-color images (e.g., to the image-segmentation machine-learning model) (operation 414), and the image-capture operation stops. Otherwise, the system can select a next color (operation 406). In some embodiments, the on-off timing of the light sources and the image-capturing operations of the cameras can be synchronized and controlled by a controller of the computer-vision system.

Figure 5:
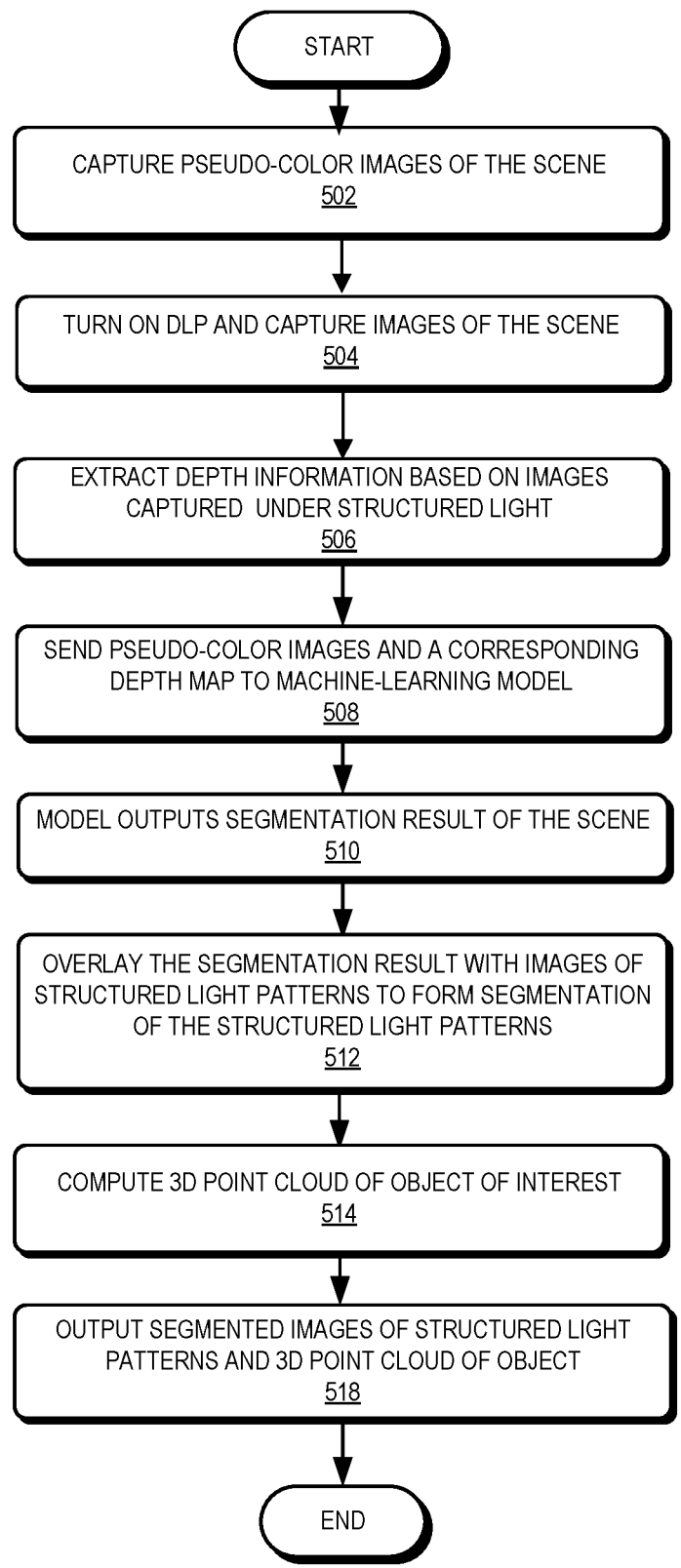
FIG. 5 presents a flowchart illustrating an exemplary image-segmentation process, according to one embodiment.

FIG. 5 presents a flowchart illustrating an exemplary image-segmentation process, according to one embodiment. During operation, the BW cameras of the computer-vision system can capture a set of pseudo-color images of a work scene (operation 502). The image-capturing process can be similar to the process shown in FIG. 4. Upon the completion of capturing the pseudo-color images, the computer-vision system can turn on the DLP in the camera unit and capture images of the scene under the illumination of the structured light (operation 504). Note that the single-color light sources are turned off at this point. The computer-vision system can further extract the depth map of the scene based on the captured images (operation 506). Depending on the type of the structured light (e.g., binary, multilevel, or time-varying), various algorithms can be used to extract the depth map. The set of pseudo-color images of the scene and the corresponding depth map of the same scene can be sent to the various input channels of a machine-learning model (operation 508). In some embodiments, the machine-learning model can include a Mask R-CNN. The machine-learning model can be trained offline using labeled training samples, which can include the pseudo-color images obtained using a process similar to the one shown in FIG. 4 or pseudo-color images combined with corresponding depth maps. The training sampled can be labeled manually. In one embodiment, each image in the set of pseudo-color images can be sent to a corresponding input channel of the machine-learning model without the depth map to simplify the segmentation process and improve the speed of segmentation.

The machine-learning model can output the segmentation result of the scene (operation 510). The segmentation result can be overlaid onto the images of the scene captured under the structured light (i.e., images of the structured light patterns) to form the segmentation of the structured light patterns (operation 512). In one embodiment, the segmentation masks (or labels) can be applied to images of the scene captured under the structured light.

The 3D point cloud of an object of interest can be computed based on the segmented images of the structured light patterns (operation 514). Because the segmentation mask can isolate the object of interest from the surrounding distractors and background, the 3D point cloud of the object can be computed more accurately using the segmented images. The 3D point cloud of the object can provide pose information, thus facilitating the robotic arm in picking up the object. The system can output the segmented images of the structured light patterns and the 3D point cloud of the object of interest (operation 516).

Figure 6:
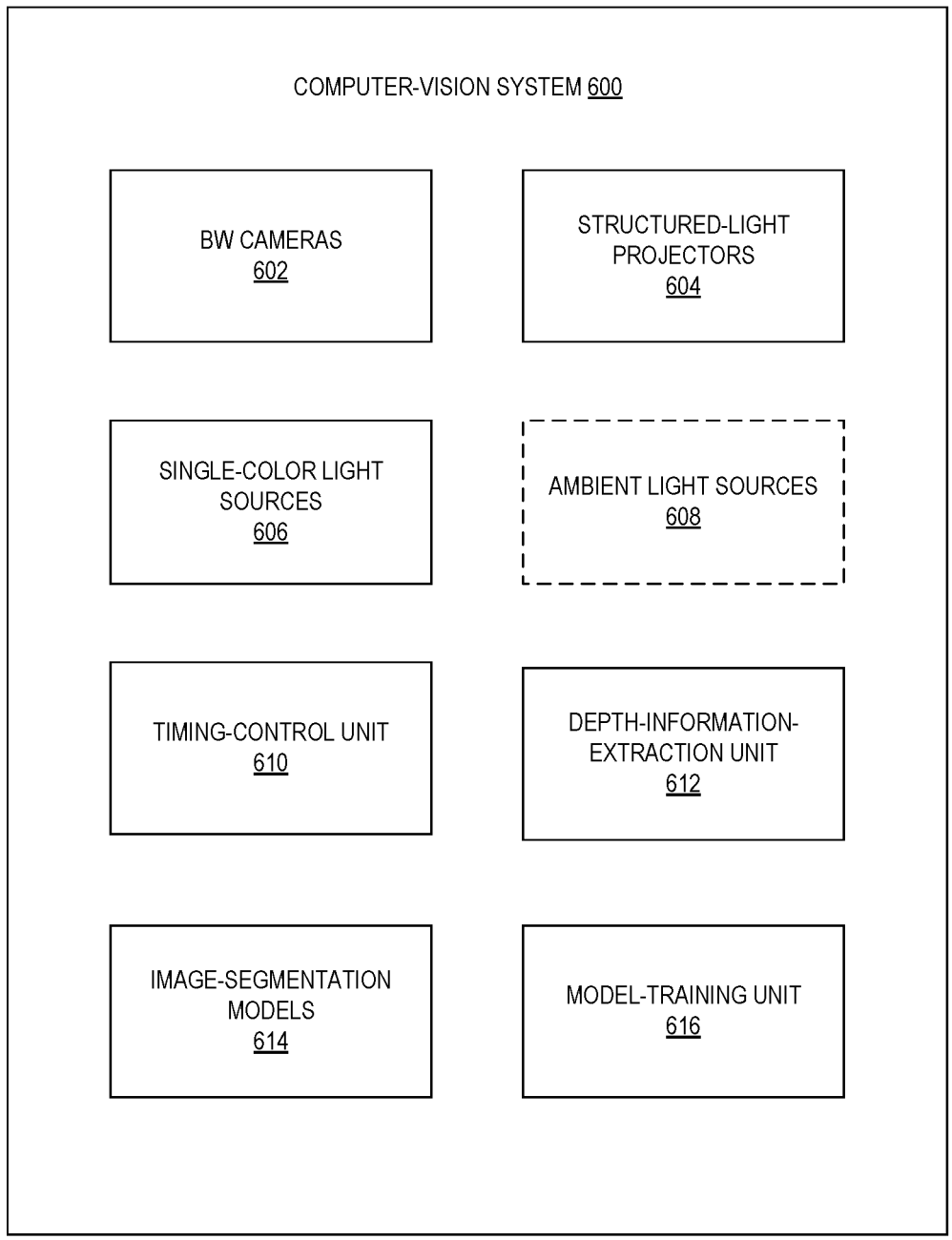
FIG. 6 shows a block diagram of an exemplary computer-vision system for robotic applications, according to one embodiment.

FIG. 6 shows a block diagram of an exemplary computer-vision system for robotic applications, according to one embodiment. Computer-vision system 600 can include one or more BW cameras 602, one or more structured-light projectors 604, a plurality of single-color light sources 606, one or more optional ambient light sources 608, a timing-control unit 610, a depth-information-extraction unit 612, one or more image-segmentation models 614, and a model-training unit 616.

BW cameras 602 can include high- and low-resolution cameras, each with a fixed zoom to simplify the camera-calibration process. Structured-light projectors 604 can include laser- or LED-based DLPs for projecting codified images onto the work scene. In some embodiments, single-color light sources 606 can include LEDs of different colors. The LEDs can be mounted onto a ring-shaped mounting structure, similar to the examples shown in FIG. 1 and FIG. 2B. Optional ambient light sources 608 can be used as a supplemental light source and can emit white light onto the scene. Timing-control unit 610 can control the on-off timing of the cameras and the light sources. In some embodiments, the on-off timing of the cameras and the light sources can be configured such that the cameras can capture a pseudo-color image of the scene when single-color light sources of the same color are turned on while other single-color light sources are turned off. Moreover, structured-light projectors 604 can be turned on when all single-color light sources 606 are turned off to allow the camera to capture images of the scene illuminated by the structured light.

Depth-information-extraction unit 612 can extract depth (or height) information about objects in the scene based on images of the scene illuminated by the structured light. Image-segmentation models 614 can accept as input the pseudo-color images and generate a segmentation result (e.g., a semantic or instance map) accordingly. In some embodiments, image-segmentation models 614 can also accept the depth information of the scene as input to refine the segmentation result, and the refined segmentation result can improve the accuracy of the computation of the 3D point cloud of an object of interest, because the background has been removed by the segmentation mask. Model-training unit 616 can perform offline training of image-segmentation models 614 using labeled samples.

Figure 7:
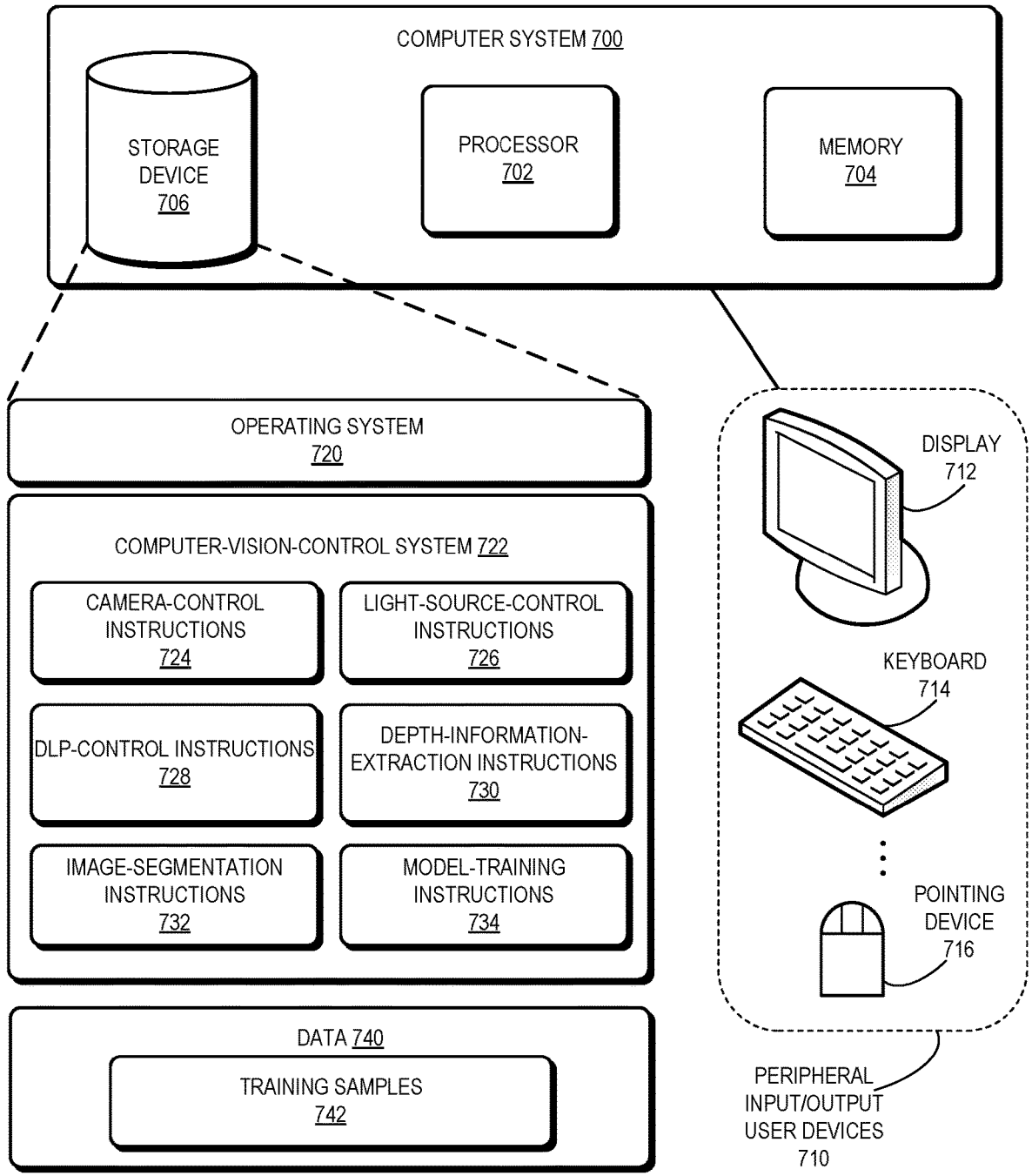
FIG. 7 illustrates an exemplary computer system that facilitates the operation of the computer-vision system, according to one embodiment.

FIG. 7 illustrates an exemplary computer system that facilitates the operation of the computer-vision system, according to one embodiment. Computer system 700 includes a processor 702, a memory 704, and a storage device 706. Furthermore, computer system 700 can be coupled to peripheral input/output (I/O) user devices 710, e.g., a display device 712, a keyboard 714, and a pointing device 716. Storage device 706 can store an operating system 720, a computer-vision-control system 722, and data 740.

Computer-vision-control system 722 can include instructions, which when executed by computer system 700, can cause computer system 700 or processor 702 to perform methods and/or processes described in this disclosure. Specifically, computer-vision-control system 722 can include instructions for controlling the BW cameras to obtain pseudo-color images of the scene (camera-control instructions 724), instructions for controlling the various light sources (e.g., single-color light sources) illuminating the scene (light-source-control instructions 726), instructions for controlling the DLPs (DLP-control instructions 728), instructions for extracting depth information (depth-information-extraction instructions 730), instructions for performing image segmentation using machine-learning models (image-segmentation instructions 732), and instructions for training the machine-learning models (model-training instructions 734). Data 740 can include training samples 742.

In general, embodiments of the present invention can provide a system and method for generating an accurate image segmentation result for a scene based on grayscale images captured by BW cameras. In addition to BW cameras, a computer-vision system can include a plurality of single-color light sources that can alternately illuminate the scene to allow the BW cameras to capture pseudo-color images of different colors. These pseudo-color images can be concatenated and sent to a machine-learning-based image-segmentation model (e.g., a Mask R-CNN), which can then output a segmentation result (e.g., a semantic map or an instance map) of the scene. The arrangements of the single-color light sources shown in FIGS. 1-2B are only examples. Other arrangements can also be possible. For example, the light sources can be arranged in two rows along the perimeter of the ring-shaped mounting structure, or the mounting structure can have other shapes. The computer-vision system can further include a structured-light projector that can project structured light onto the scene to allow the BW cameras to capture images of the scene illuminated by the structured light. Depth information (e.g., a depth map) can be computed based on such images. The depth information can then be used to refine the image-segmentation result. The refined image-segmentation result can be used to improve the accuracy of the computation of the 3D point cloud of an object of interest.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware devices or apparatus. The hardware modules or apparatus can include, but are not limited to, application-specific integrated circuit (ASIC) chips, field-programmable gate arrays (FPGAs), dedicated or shared processors that execute a particular software unit or a piece of code at a particular time, and other programmable-logic devices now known or later developed. When the hardware devices or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-vision system, comprising:
   one or more black-and-white cameras;
   one or more sets of single-color light sources to illuminate a scene, wherein a respective set of light sources comprises multiple single-color light sources of different colors, wherein the multiple single-color light sources within a given set are to turn on alternately, one at a time, and wherein the black-and-white cameras are to capture a pseudo-color image of the scene each time the scene is illuminated by a respective single-color light source of a particular color;
   a processor; and
   a storage device storing instructions which when executed by the processor cause the processor to perform a method, the method comprising applying a machine-learning technique to generate a segmentation result of the scene based on multiple pseudo-color images corresponding to different colors;
   wherein applying the machine-learning technique comprises concatenating the pseudo-color images of different colors in increasing wavelength order and inputting the concatenated pseudo-color images to a neural network.

2. The computer-vision system of claim 1, wherein the method further comprises:
   extracting a feature map from each image of the scene; and
   generating a fused feature map by concatenating feature maps extracted from multiple pseudo-color images corresponding to different colors.

3. The computer-vision system of claim 1, further comprising:
   one or more structured-light projectors to project structured light onto the scene;
   wherein the method further comprises extracting depth information based on pseudo-color images of the scene illuminated by the structured light.

4. The computer-vision system of claim 3, wherein generating the segmentation result of the scene further comprises combining the multiple pseudo-color images corresponding to different colors with the depth information.

5. The computer-vision system of claim 4, wherein the method further comprises computing a 3D point cloud of an object of interest based on the segmentation result and the depth information.

6. The computer-vision system of claim 1, wherein the multiple single-color light sources comprise light-emitting diodes (LEDs), and wherein colors of the multiple single-color light sources range between ultraviolet and infrared.

7. The computer-vision system of claim 1, wherein the one or more sets of single-color light sources are mounted on a ring-shaped mounting structure positioned above the scene.

8. The computer-vision system of claim 7, wherein multiple single-color light sources of a same color are arranged on the ring-shaped mounting structure in a rotationally symmetric manner.

9. A computer-implemented method, the method comprising:
   configuring, by a computer, one or more sets of single-color light sources to illuminate a scene, wherein a respective set of light sources comprises multiple single-color light sources of different colors, and wherein configuring the single-color light sources comprises alternately turning on the single-color light sources in each set, one at a time; configuring one or more black-and-white cameras to capture a pseudo-color image of the scene each time the scene is illuminated by a respective single-color light source of a particular color;
   applying a machine-learning technique to generate a segmentation result of the scene based on multiple pseudo-color images corresponding to different colors;
   wherein applying the machine-learning technique comprises concatenating the multiple pseudo-color images of different colors in increasing wavelength order and inputting the concatenated pseudo-color images to a neural network.

10. The method of claim 9, wherein implementing the deep-learning neural network further comprises:
    extracting a feature map from each image of the scene; and
    generating a fused feature map by concatenating feature maps extracted from multiple pseudo-color images corresponding to different colors.

11. The method of claim 9, further comprising:
    projecting structured light onto the scene; and
    extracting depth information based on pseudo-color images of the scene illuminated by the structured light.

12. The method of claim 11, wherein generating the segmentation result of the scene comprises combining the multiple pseudo-color images corresponding to different colors with the depth information.

13. The method of claim 12, further comprising computing a 3D point cloud of an object of interest based on the segmentation result and the depth information.

14. The method of claim 9, wherein the multiple single-color light sources comprise light-emitting diodes (LEDs), and wherein colors of the multiple single-color light sources range between ultraviolet and infrared.

15. The method of claim 9, wherein the one or more sets of single-color light sources are mounted on a ring-shaped mounting structure positioned above the scene.

16. The method of claim 15, wherein multiple single-color light sources of a same color are arranged on the ring-shaped mounting structure in a rotationally symmetric manner.

* * * * *